(12) United States Patent
Poulin

(10) Patent No.: US 9,187,290 B2
(45) Date of Patent: Nov. 17, 2015

(54) CORDSET ASSEMBLY

(75) Inventor: Marc Poulin, Chesterfield, MI (US)

(73) Assignee: Lear Corporation, Southfield, MI (US)

( * ) Notice: Subject to any disclaimer, the term of this patent is extended or adjusted under 35 U.S.C. 154(b) by 533 days.

(21) Appl. No.: 13/616,346

(22) Filed: Sep. 14, 2012

(65) Prior Publication Data

US 2014/0077019 A1 Mar. 20, 2014

(51) Int. Cl.
*H02J 7/00* (2006.01)
*H02J 7/04* (2006.01)
*B65H 75/22* (2006.01)
*B65H 75/44* (2006.01)
*H01R 13/72* (2006.01)
*B60L 11/18* (2006.01)

(52) U.S. Cl.
CPC .............. *B65H 75/22* (2013.01); *B60L 11/182* (2013.01); *B60L 11/1818* (2013.01); *B65H 75/4473* (2013.01); *H01R 13/72* (2013.01); *B60L 11/1846* (2013.01); *B65H 2402/412* (2013.01); *B65H 2701/34* (2013.01); *Y02T 10/7005* (2013.01); *Y02T 90/14* (2013.01)

(58) Field of Classification Search
USPC ........... 320/109, 107, 111, 104, 105; 439/501
See application file for complete search history.

(56) References Cited

U.S. PATENT DOCUMENTS

| | | | |
|---|---|---|---|
| 4,669,791 A | 6/1987 | Savill | |
| 4,707,046 A | 11/1987 | Strand | |
| 5,080,600 A | 1/1992 | Baker et al. | |
| 5,344,330 A | 9/1994 | Hoffman | |
| 5,344,331 A | 9/1994 | Hoffman et al. | |
| 5,346,406 A | 9/1994 | Hoffman et al. | |
| 5,385,480 A | 1/1995 | Hoffman | |
| 5,478,250 A | 12/1995 | Hoffman | |
| 5,575,675 A | 11/1996 | Endo et al. | |
| 5,664,960 A | 9/1997 | Fukushima | |
| 5,674,086 A | 10/1997 | Hashizawa et al. | |
| 5,676,560 A | 10/1997 | Endo et al. | |
| 5,751,135 A | 5/1998 | Fukushima et al. | |
| 5,816,643 A | 10/1998 | Itou et al. | |
| 5,873,737 A | 2/1999 | Hashizawa et al. | |
| 5,906,500 A | 5/1999 | Kakuta et al. | |
| 6,203,354 B1 | 3/2001 | Kuwahara et al. | |
| 6,511,341 B1 | 1/2003 | Finona et al. | |
| 7,052,282 B2 | 5/2006 | Meleck et al. | |
| 7,259,536 B1 * | 8/2007 | Ketner ......................... | 320/101 |
| 7,878,866 B1 | 2/2011 | Kwasny et al. | |
| 8,016,607 B2 | 9/2011 | Brown, II | |
| 2009/0035986 A1 * | 2/2009 | Tracy et al. ................... | 439/501 |
| 2011/0070758 A1 | 3/2011 | Poulin et al. | |
| 2011/0172839 A1 * | 7/2011 | Brown et al. ................. | 700/292 |
| 2011/0204715 A1 * | 8/2011 | Nakamura et al. ........... | 307/10.1 |
| 2013/0021162 A1 * | 1/2013 | DeBoer et al. ................ | 340/635 |
| 2013/0099736 A1 * | 4/2013 | Roberts et al. ................ | 320/109 |
| 2013/0099738 A1 * | 4/2013 | Brockman et al. ............ | 320/109 |
| 2013/0175083 A1 * | 7/2013 | Bonwit et al. ................ | 174/520 |

OTHER PUBLICATIONS

SAE International, "Surface Vehicle Recommended Practice J1772—SAE Electric Vehicle and Plug in Hybrid Electric Vehicle Conductive Charge Coupler," proposed draft revised Aug. 2009.

* cited by examiner

*Primary Examiner* — Edward Tso
*Assistant Examiner* — Alexis A Boateng
(74) *Attorney, Agent, or Firm* — Brooks Kushman P.C.

(57) ABSTRACT

A cordset assembly having a charge controller interruption device and a cord reel. The charge control interruption device may have a housing and at least one cord. The cord reel may have first and second reel portions. The cord may be wound around the housing between the first and second reel portions to facilitate storage.

19 Claims, 5 Drawing Sheets

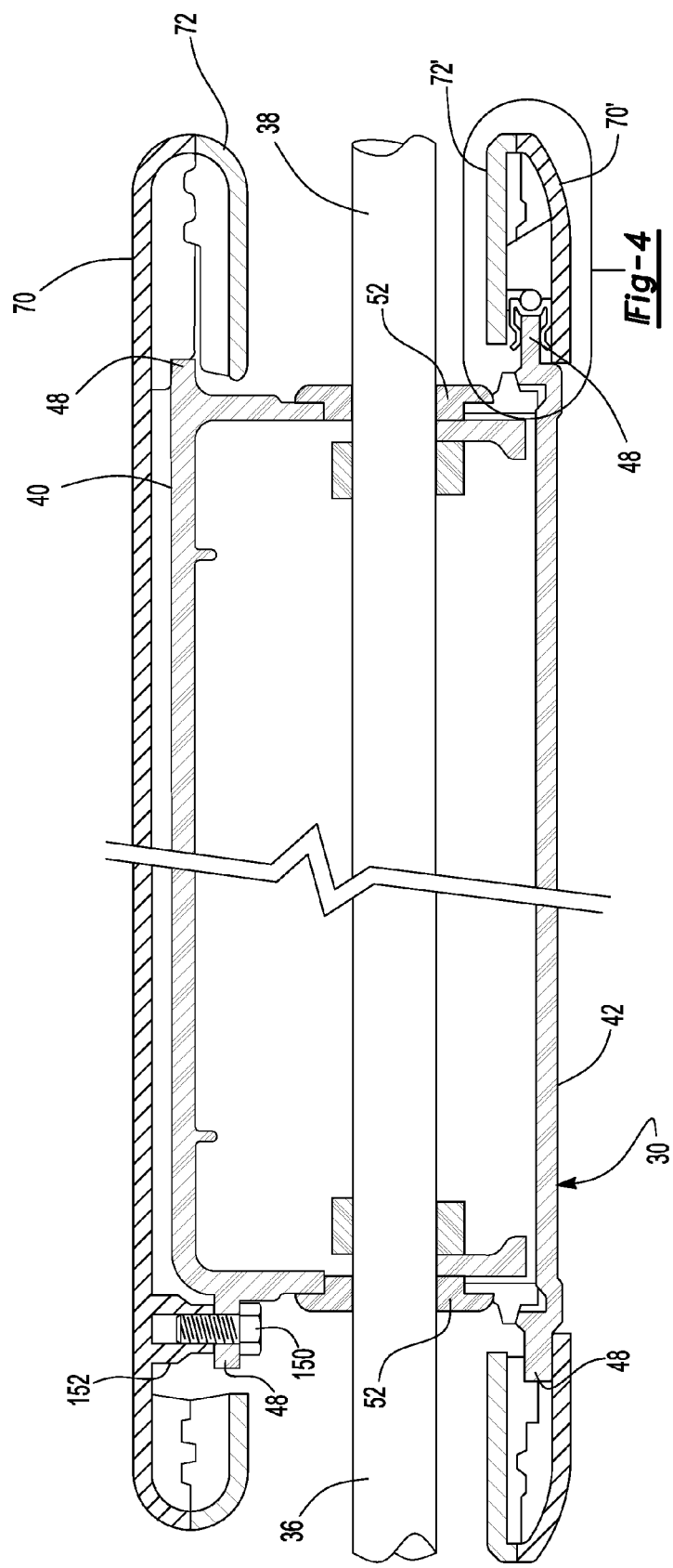

CORDSET ASSEMBLY

TECHNICAL FIELD

This patent application relates to a cordset assembly that may provide electrical energy to a vehicle.

BACKGROUND

An electrical connector assembly for a vehicle is disclosed in U.S. Pat. No. 5,344,330.

SUMMARY

In at least one embodiment, a cordset assembly is provided. The cordset assembly may include a charge controller interruption device and a cord reel. The charge controller interruption device may have a housing and a cord. The cord reel may include a first reel portion and a second reel portion. The first reel portion may have a first panel disposed on the housing and a second panel disposed on the first panel. The second reel portion may be spaced apart from the first reel portion. The second reel portion may have a first panel disposed on the housing and a second panel disposed on the first panel. The first cord may be wound around the housing between the first and second reel portions.

In at least one embodiment, a cordset assembly is provided. The cordset assembly may include a charge controller interruption device and a cord reel. The charge controller interruption device may include a housing that has a tab. The cord reel may be disposed proximate the charge controller interruption device and may have a reel portion. The reel portion may include first and second panels, a detent clip, and a biasing member. The first and second panels may cooperate to at least partially define a tab opening that receives the tab. The detent clip may be disposed on the tab. The biasing member may be disposed between the first and second panels. The biasing member may engage the detent clip to secure the first and second panels to the housing and may disengage the detent clip to allow the first and second panels to disengage from each other.

In at least one embodiment, a cordset assembly is provided. The cordset assembly may include a charge controller interruption device and a cord reel. The charge controller interruption device may include a housing having first, second, third, and fourth tabs. The cord reel may have a first reel portion and a second reel portion. The first reel portion may have first and second panels that cooperate to at least partially define first and second tab openings that receive the first and second tabs, respectively. The second reel portion may have first and second panels that cooperate to at least partially define third and fourth tab openings that receive the third and fourth tabs, respectively.

BRIEF DESCRIPTION OF THE DRAWINGS

FIG. 5 is a section view of illustrating variations of the cordset assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
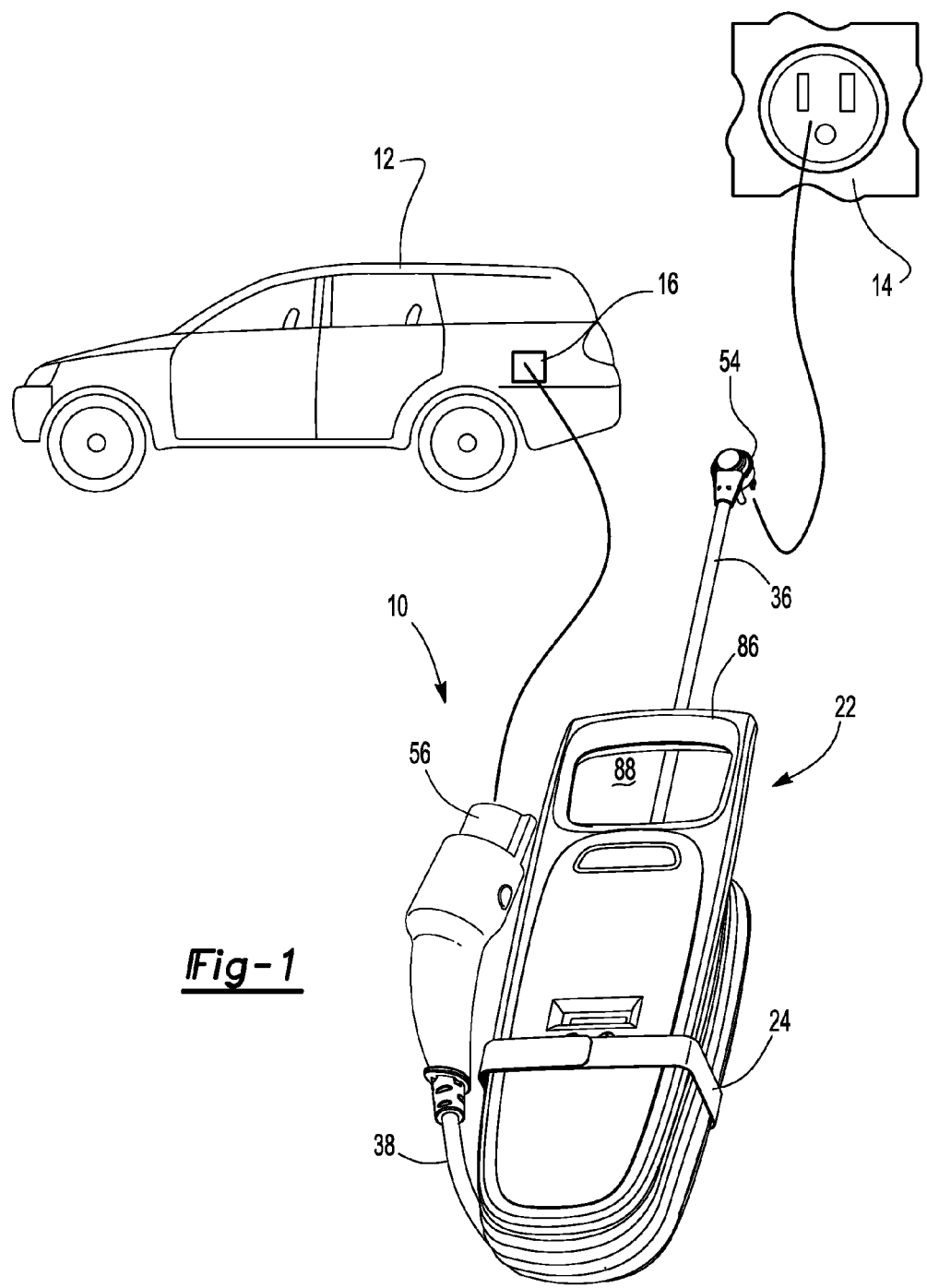
FIG. 1 is a perspective view of an exemplary cordset assembly.
Figure 2:
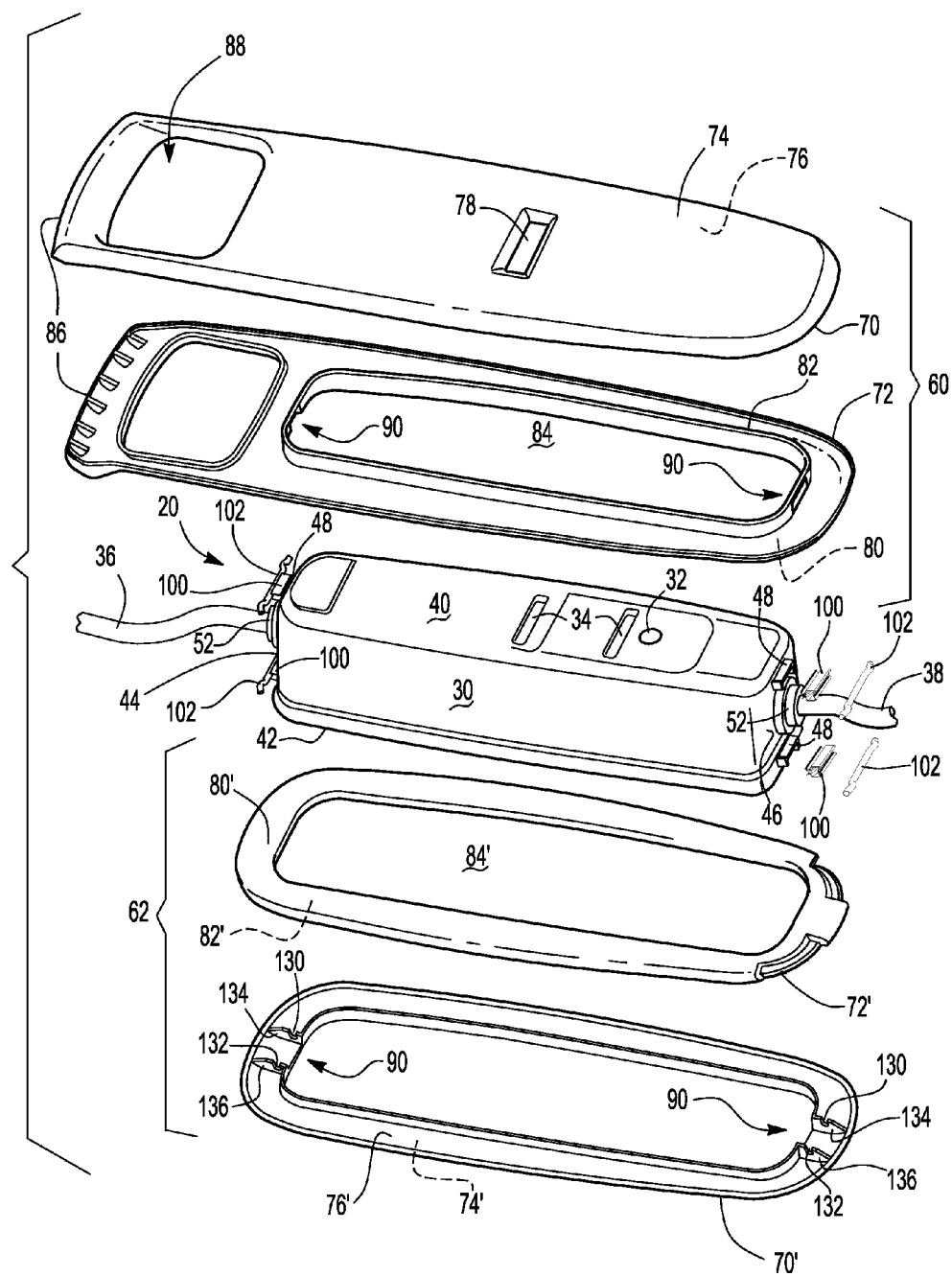
FIG. 2 is an exploded view of a portion of the cordset assembly of FIG. 1.

Referring to FIGS. 1 and 2, an exemplary cordset assembly 10 is shown. The cordset assembly 10 may facilitate charging of an electrical power source of a vehicle 12. For example, the cordset assembly 10 may electrically couple an external power source 14 that is remote from the vehicle 12 to a vehicle electrical power source 16, such as a battery. Electrical outlets may be provided with the external power source 14 and vehicle electrical power source 16 to provide electrical connections with the cordset assembly 10. In at least one embodiment, the cordset assembly 10 may include a charge controller interruption device (CCID) 20, a cord reel 22, and optionally a strap 24.

The charge controller interruption device 20 may monitor and/or control the flow of electrical power from the external power source 14 to the vehicle 12. For example, the charge controller interruption device 20 may be configured to enable or disable the flow of electrical power to the vehicle 12. In at least one embodiment, the charge controller interruption device 20 may disable the flow of electricity to the vehicle 12 when an error or fault condition is detected. Error or fault conditions may include, but are not limited to improper connections to the external power source 14 and/or vehicle electrical power source 16, ground faults, overheating, and the like. In at least one embodiment, the charge controller interruption device 20 may include a housing 30, an input device 32, an output device 34, a first cord 36, and a second cord 38.

The housing 30 may contain electrical circuitry and components of the charge controller interruption device 20. As such, the housing 30 may help protect and/or electrically insulate the components of the charge controller interruption device 20. The housing 30 may include one or more walls or panels that may be vibration welded, bonded, or joined together in any suitable manner. The housing 30 may be made of any suitable material, such as a polymeric material.

Figure 3:
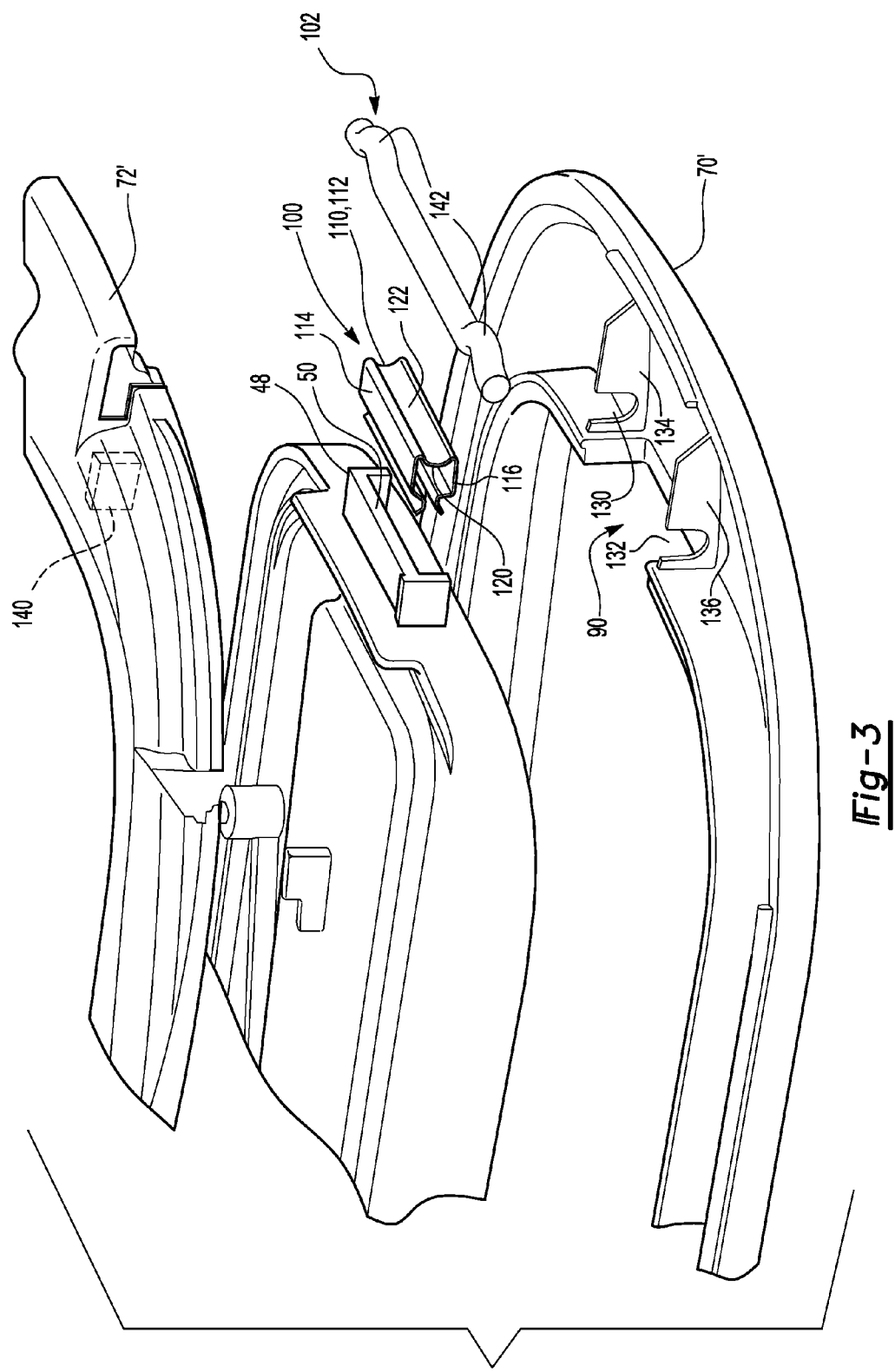
FIG. 3 is a magnified view of a portion of the cordset assembly of FIG. 1.

In at least one embodiment, the housing 30 may include a first surface 40, a second surface 42, a first end surface 44, and a second end surface 46. The first and second surfaces 40, 42 may be disposed opposite each other. The first and second end surfaces 44, 46 may extend from the first surface 40 to the second surface 42 and may be disposed opposite each other. The housing 30 may include one or more tabs 48. In the embodiment shown in FIG. 2, a pair of tabs 48 extends from the first end surface 44 and from the second end surface 46. The tabs 48 may be spaced apart from each other and from a corresponding cord. For example, the tabs 48 on the first end surface 44 may be disposed on opposite sides of the first cord 36 and the tabs 48 on the second end surface 46 may be disposed on opposite sides of the second cord 38. As is best shown in FIG. 3, a tab 48 may have a tab end surface 50 that faces away from a corresponding end surface 44, 46.

Referring again to FIG. 2, one or more input devices 32 may be provided with the charge controller interruption device 20. An input device 32 may have any suitable configuration. For instance, an input device 32 may be configured as a button, switch, or sensor and may allow a user to provide a manual input command to control operation of the charge controller interruption device 20. In at least one embodiment, the input device 32 may be a charge rate selection button that may allow a user to select a charge mode, such as a manual or automatic charge mode.

One or more output devices 34 may be provided with the charge controller interruption device 20. An output device 34 may have any suitable configuration. For example, an output device 34 may provide visual feedback to a user and may be configured as a light or display. In at least one embodiment, one or more output devices 34 may be configured as light emitting diodes that may provide feedback regarding the operational status of the charge controller interruption device 20, such as a charge level, charge rate, and/or fault or error conditions.

Referring to FIGS. 1 and 2, the first and second cords 36, 38 may extend from the same side or different sides of the housing 30. For example, the first and second cords 36, 38 may extend from the first and second end surfaces 44, 46, respectively. In at least one embodiment, the first and second cords 36, 38 may each extend through a corresponding grommet 52 that may be mounted to the housing 30. The first and second cords 36, 38 may be electrically conductive flexible power cords that may have an electrical terminal at a free end. For instance, the first cord 36 may have a first electrical terminal 54 or plug that may be configured to engage and mate with a corresponding electrical outlet that is electrically connected to the external power source 14. The second cord 38 may have a second electrical terminal 56 or plug that may be configured to engage and mate with a corresponding electrical outlet on the vehicle 12.

Referring to FIGS. 1 and 2, the cord reel 22 may be disposed proximate the charge controller interruption device 20. In at least one embodiment, the cord reel 22 may include a first reel portion 60 and a second reel portion 62.

The first and second reel portions 60, 62 may be spaced apart from each other and may be fixedly or non-fixedly coupled to the charge controller interruption device 20 as will be discussed in more detail below. The first and second reel portions 60, 62 may facilitate storage of the first and/or second cords 36, 38. As is best shown in FIG. 1, the first and/or second cords 36, 38 may be wound around the housing 30 between the first and second reel portions 60, 62 to facilitate storage. In addition, the strap 24, if provided, may extend around the housing 30 and the cord reel 22 and help secure the first and second cords 36, 38. The strap 24 may include a fastener, such as a snap, button, hook and loop fastener, or the like that may secure end portions of the strap 24 to each other to help retain the strap 24 on the cordset assembly 10.

The first reel portion 60 may include a first panel 70 and a second panel 72. The first and second panels 70, 72 may be made of any suitable material, such as a polymeric material like polycarbonate. The first and second panels 70, 72 may engage each other and may be fixedly or non-fixedly coupled together as will be discussed in more detail below.

The first panel 70 may include a first surface 74 and a second surface 76. The first surface 74 may be an exterior surface and may face away from the charge controller interruption device 20. The second surface 76 may be disposed opposite the first surface 74. In addition, at least a portion of the second surface 76 may be spaced apart from the housing 30 as is best shown in FIG. 5. One or more openings 78 may be provided that extend from the first surface 74 to the second surface 76 to provide access to an input device 32 or make an output device 34 visible. In at least one embodiment, the second surface 76 may include one or more vibration welding pads that may engage the first panel 70 and at least partially melt during vibration welding to fixedly couple a portion of the first panel 70 to the second panel 72.

The second panel 72 may also include a first surface 80 and a second surface 82. The first surface 80 may be an exterior surface that may be disposed opposite or face away from the first surface 74 of the first panel 70. As such, the first surface 80 may engage the first and/or second cords 36, 38 when wound around the housing 30. The second surface 82 may be disposed opposite the first surface 80 and may engage the second surface 76 of the first panel 70. The second panel 72 may include a housing opening 84 that receives the housing 30 of the charge controller interruption device 20.

The first and second panels 70, 72 may cooperate to define a handle 86 and a handle opening 88. In addition, the first and second panels 70, 72 may cooperate to define or individually define one or more tab openings 90. In the embodiment shown, the first and second panels 70, 72 cooperate to define two tab openings 90 that are disposed on opposite sides of the housing opening 84. Each tab opening 90 may receive a corresponding tab 48 on the housing 30.

The second reel portion 62 may have a similar configuration as the first reel portion 60. In at least one embodiment, the second reel portion 62 may have a first panel 70' and a second panel 72' that are similar to the first panel 70 and the second panel 72 of the first reel portion 60. The first panel 70' may include a first surface 74' and a second surface 76' disposed opposite the first surface 74'. The first panel 70' may also include a housing opening 78' that receives the housing 30 of the charge controller interruption device 20.

The second panel 72' may also include a first surface 80' and a second surface 82'. The first surface 80' may be an exterior surface that may be disposed opposite or face away from the first surface 74' of the first panel 70'. As such, the first surface 80' may engage the first and/or second cords 36, 38 when wound around the housing 30. The second surface 82' may be disposed opposite the first surface 80' and may engage the second surface 76' of the first panel 70'. The second panel 72' may also include a housing opening 84' that receives the housing 30 of the charge controller interruption device 20.

As previously mentioned, the first and second reel portions 60, 62 may be non-fixedly coupled to the charge controller interruption device 20. Moreover, the first and second panels 70, 72 and/or 70', 72' may be configured to break away or separate from each other during an impact event, such as may occur when the cordset assembly 10 is dropped. The separation of the first and second panels 70, 72 and/or 70', 72' may help dissipate energy associated with an impact event to mitigate damage to the cordset assembly 10, thereby improving durability.

Figure 4:
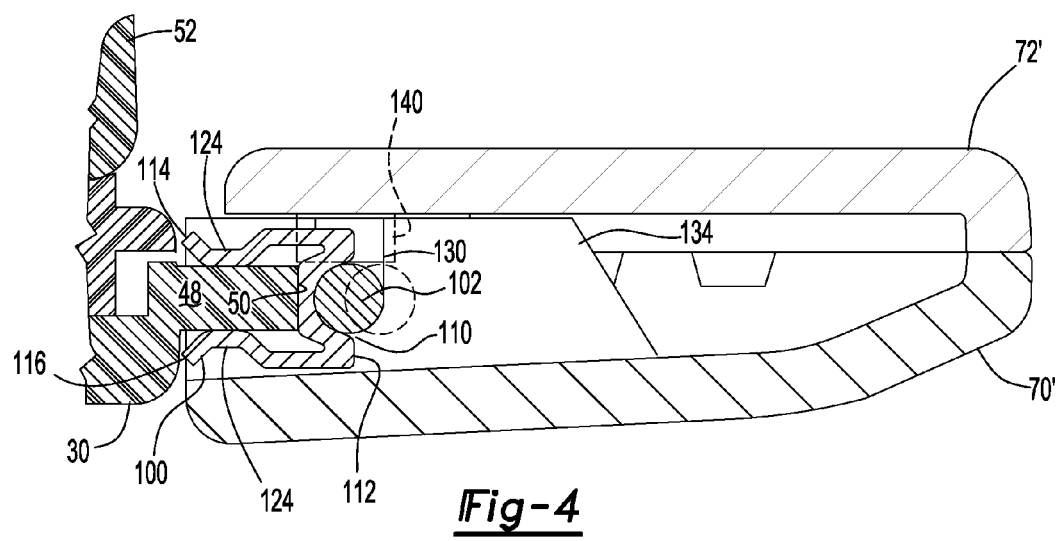
FIG. 4 is a section view of a portion of the cordset assembly.

Referring to FIGS. 2-4, first and second panels 70, 72 and 70', 72' are shown that are configured to break away. A break away configuration may include at least one detent clip 100 and at least one biasing member 102. The example discussed below is made with reference to the first and second panels 70', 72' but may also apply to the first and second panels 70, 72.

The detent clip 100 may be fixedly disposed on the tab 48. In addition, the detent clip 100 may be spaced apart from the first and/or second panels 70', 72'. The detent clip 100 may have a groove 110 that may receive and inhibit movement of the biasing member 102 in one or more directions. For example, the detent clip 100 may include and end wall 112, a first arm 114, and a second arm 116.

The end wall 112 may have a first surface 120 and a second surface 122. The first surface 120 may engage the end surface 50 of the tab 48. The second surface 122 may be disposed opposite the first surface 120 and may engage the biasing member 102. The groove 110 may be provided in or extend from the second surface 122. In at least one embodiment, the groove 110 may be configured as a channel that extends continuously across the second surface 122. In the embodiment shown, the groove 110 has a curved or generally semicircular cross-section, although other cross-sectional configurations are contemplated.

The first and second arms 114, 116 may extend from opposing ends of the end wall 112 and away from the second surface 122. The first and second arms 114, 116 may have substantially similar configurations. For example, the first and second arms 114, 116 may be configured as mirror images of each other. The first and second arms 114, 116 may each include an indentation 124 that extends toward and engages the tab 48.

The biasing member 102 may be disposed between the first and second panels 70', 72' to selectively couple and release the first panel 70' and the second panel 72'. In at least one embodiment, the biasing member 102 may be configured as a flexible wire. The biasing member 102 may engage the first and/or second panels 70', 72'. For example, the biasing member 102 may be received in first and second slots 130, 132 that may be provided in first and second ribs 134, 136, respectively. In FIG. 3, the first and second ribs 134, 136 extend from the first panel 70' but may extend from the second panel 72' in one or more embodiments. In at least one embodiment, the first and second slots 130, 132 may each have an open end that faces toward an adjacent panel. In the embodiment shown in FIG. 3, the open ends face toward the second panel 72'.

One or more retention tabs 140 may extend toward and may engage the biasing member 102 to hold the biasing member 102 in the first and second slots 130, 132. In FIG. 3, two retention tabs 140 are provided that extend from the second panel 72' toward the first panel 70'. The retention tabs 140 may be spaced apart from each other and may be disposed adjacent to the first and second ribs 134, 136.

The biasing member 102 may have one or more bends 142 that may inhibit axial movement or movement of the biasing member 102 through the first and second slots 130, 132. The bends 142 may engage the first and second ribs 134, 136 and may be disposed on opposite sides of the first and second ribs 134, 136 than the detent clip 100. Alternatively, the biasing member 102 may have opposing ends that engage additional ribs or protrusions on the first and second panels 70', 72' to inhibit axial movement. The biasing member 102 may be substantially linear between the bends 142 when in a nominal or unflexed position in one or more embodiments.

Referring to FIG. 4, the biasing member 102 may be configured to flex or bend to disengage the detent clip 100 and permit the first and second panels 70', 72' to disengage from each other and/or the charge controller interruption device 20. A sufficient impact force exerted on the first and/or second panels 70', 72' may transfer energy to the biasing member 102. The biasing member 102 may flex from a nominal position (shown in solid lines in FIG. 4) in which the biasing member 102 is disposed in and may engage the groove 110 to a flexed position (shown in phantom in FIG. 4) in which the biasing member 102 disengages the groove 110. More specifically, the biasing member 102 may flex away from the tab end surface 50 between the first and second ribs 134, 136. Once the biasing member 102 disengaged the detent clip 100 the first and second panels 70', 72' may move with respect to each other. Such movement may result in the separation of first and second panels 70', 72'. The force necessary to flex and disengage the biasing member 102 may be based on the shape of the groove 110 as well as the configuration of the biasing member 102, such as its diameter, length and/or shape. Optionally, additional biasing members, such as springs, may be provided to exert force on the biasing member 102 to help hold the biasing member 102 in the groove 110, thereby increasing the amount of force needed to disengage or cause the first panel 70' to break away from the second panel 72'.

The configuration shown in FIG. 4 may be provided with each tab 48 and the first and second reel portions 60, 62 as is best shown in FIG. 2. Alternatively, a detent clip 100 and biasing member 102 may not be provided with each tab 48 as shown in FIG. 5. More specifically, FIG. 5 shows a second reel portion 62 in which the tab 48 on the lower left side is received in a tab opening 90 without a detent clip 100. As such, this tab 48 may be received between and may engage the first and second panels 70', 72'. Moreover, the first and second panels 70', 72' may be vibration welded to each other in this position. This configuration may also be provided with the first reel portion 60 in one or more embodiments.

FIG. 5 also shows an example of a reel portion that has fixedly coupled panels. More specifically, the first reel portion 60 is shown with first and second panels 70, 72 that are non-releasably attached. In the upper left corner, the first panel 70 is coupled to the second panel 72 with a fastener 150, such as screw. The fastener 150 may engage or extend through the tab 48 and may engage a mounting boss 152. The mounting boss may extend from the second surface 76 of the first panel 70 toward the second panel 72 in one or more embodiments. Such a configuration may be employed with one or more tabs 48 when a breakaway configuration is not desired. Optionally, an opposing tab, such as the tab 48 in the upper right corner, may have a configuration like that previously described for the lower left corner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cordset assembly comprising:
   a charge controller interruption device that includes a housing having a tab; and
   a cord reel disposed proximate the charge controller interruption device, the cord reel including a reel portion that includes:
   first and second panels that cooperate to at least partially define a tab opening that receives the tab,
   a detent clip that is disposed on the tab and is spaced apart from the first and second panels, and
   a biasing member disposed between the first and second panels;
   wherein the biasing member engages the detent clip to secure the first and second panels to the housing and wherein the biasing member disengages the detent clip to allow the first and second panels to disengage from each other.

2. The cordset assembly of claim 1 wherein the charge controller interruption device further comprises a first cord and a second cord that extend from the housing, wherein the first and second cords are configured to be wound around the housing.

3. The cordset assembly of claim 2 further comprising a strap that extends around the cord reel and the first and second cords to secure the first and second cords when the first and second cords are wound around the housing.

4. The cordset assembly of claim 2 wherein the first cord is configured to be electrically coupled to a vehicle and the second cord is configured to be electrically coupled to a power source remote from the vehicle.

5. The cordset assembly of claim 1 wherein the first and second panels of the reel portion cooperate to define a handle and a handle opening disposed adjacent to the handle.

6. The cordset assembly of claim 1 wherein the first and second panels of the reel portion are configured to disengage from each other and from the housing in response to an impact.

7. The cordset assembly of claim 6 wherein the cord reel has a second reel portion, wherein first and second panels of the second reel portion are configured to disengage from each other and from the housing in response to an impact.

8. The cordset assembly of claim 1 wherein the first panel includes first and second ribs that have first and second slots, respectively, that receive the biasing member.

9. The cordset assembly of claim 8 wherein the first and second slots each have an open end that faces toward the second panel, and wherein the second panel includes a retention tab that extends toward the first panel to inhibit movement of the biasing member toward the second panel.

10. The cordset assembly of claim 1 wherein the detent clip is fixedly disposed on the tab and has a groove that receives the biasing member.

11. The cordset assembly of claim 10 wherein the tab has a tab end surface and wherein the detent clip includes an end wall that defines the groove and is disposed between the tab end surface and the biasing member.

12. The cordset assembly of claim 11 wherein the biasing member moves away from the tab end surface to disengage the detent clip.

13. A cordset assembly comprising:
   a charge controller interruption device that includes a housing having a first, second, third, and fourth tabs; and
   a cord reel having:
      a first reel portion having first and second panels that cooperate to at least partially define first and second tab openings that receive the first and second tabs, respectively;
      a second reel portion having first and second panels that cooperate to at least partially define third and fourth tab openings that receive the third and fourth tabs, respectively;
      a first detent clip disposed on the third tab; and
      a first biasing member disposed between the first and second panels of the second reel portion, wherein the first biasing member engages the first detent clip to secure the first and second panels of the second reel portion to the housing and wherein the first biasing member disengages the first detent clip to allow the first and second panels of the second reel portion to disengage from each other.

14. The cordset assembly of claim 13 wherein the first panel of the first reel portion has a mounting boss and wherein a fastener engages the first tab to fixedly couple the first reel portion to the mounting boss.

15. The cordset assembly of claim 14 wherein the second tab is disposed opposite the first tab and engages the first and second panels of the first reel portion.

16. The cordset assembly of claim 13 wherein the first detent clip is spaced apart from the first and second panels of the first reel portion.

17. The cordset assembly of claim 13 wherein the third tab is disposed opposite the fourth tab and engages the first and second panels of the second reel portion.

18. The cordset assembly of claim 13 further comprising a second detent clip disposed on the fourth tab and a second biasing member disposed between the first and second panels of the second reel portion, wherein the second biasing member engages the second detent clip to secure the first and second panels of the second reel portion to each other and wherein the first and second biasing members disengage the first and second detent clips, respectively, to allow the first and second panels to disengage from each other.

19. A cordset assembly comprising:
   a charge controller interruption device that includes a housing having a tab; and
   a cord reel disposed proximate the charge controller interruption device, the cord reel including a reel portion that includes:
      first and second panels that cooperate to at least partially define a tab opening that receives the tab,
      a detent clip that is fixedly disposed on the tab and has a groove, and
      a biasing member disposed between the first and second panels;
   wherein the groove receives the biasing member, the biasing member engages the detent clip to secure the first and second panels to the housing, and the biasing member disengages the detent clip to allow the first and second panels to disengage from each other.

* * * * *